Feb. 20, 1934. V. R. DESPARD Re. 19,092

ELECTRIC WIRING APPARATUS

Original Filed July 31, 1931 4 Sheets-Sheet 1

Inventor

Victor R. Despard

By Wheeler, Dort, Morse & Grindle

Attorneys

Feb. 20, 1934. V. R. DESPARD Re. 19,092

ELECTRIC WIRING APPARATUS

Original Filed July 31, 1931 4 Sheets-Sheet 2

Inventor

Victor R. Despard,

By Watson, Cole, Grindle & Watson

Attorneys

ELECTRIC WIRING APPARATUS

Original Filed July 31, 1931 4 Sheets-Sheet 3

Inventor
Victor R. Despard,
By Watson, Cole, Grindle & Grindle
Attorneys

Feb. 20, 1934. V. R. DESPARD Re. 19,092

ELECTRIC WIRING APPARATUS

Original Filed July 31, 1931 4 Sheets-Sheet 4

Inventor

Victor R. Despard,

By Watson, Cole, Morse & Grindle

Attorneys

Reissued Feb. 20, 1934

Re. 19,092

UNITED STATES PATENT OFFICE 19,092

ELECTRIC WIRING APPARATUS

Victor R. Despard, Syracuse, N. Y., assignor to Pass & Seymour, Inc., Syracuse, N. Y., a corporation of New York Original No. 1,875,224, dated August 30, 1932, Serial No. 554,323, July 31, 1931. Application for reissue May 11, 1933. Serial No. 670,598

18 Claims. (Cl. 247—20)

This invention relates to apparatus for electric wiring for houses and buildings, and more particularly to the terminal and switching apparatus as applied in walls, baseboards, and the like and mounted in outlet boxes, the outer faces of which are covered with wall plates.

It is a general object of the present invention to provide novel and improved apparatus of the type set forth above.

More particularly it is an object of the invention to provide electric wiring apparatus wherein a plurality of wiring devices can be arranged in the space heretofore allotted to a single device and in which interchangeability of the devices provides for ready assembly of any desired combination of devices in a single outlet box.

One of the important features of the present invention resides in the provision of electric wiring devices of various types which are less than single gang size and can be mounted singly or in multiple behind wall plates in which they are interchangeable as regards position and function.

Another feature of the invention resides in the provision of a wall plate of single gang size provided with a plurality of uniform openings adapted to each receive in cooperation therewith a wiring device of which a plurality of types are provided for various purposes and which can be assembled in any desired combination and interchangeably behind the plate.

Another feature of the invention consists in the provision of supporting means whereby a plurality of wiring devices may be mounted behind a single-gang plate and accurately positioned and spaced in respect to the uniform openings therein.

Still another important feature of the invention resides in the provision of a mounting bridge which is adapted to be extended longitudinally of a single-gang outlet box and is arranged to carry one or more wiring devices properly spaced behind a wall plate having uniform openings therein, and in which the bridge is provided with means to cooperate with portions of the wiring devices for holding them in position in the bridge.

A further important feature of the invention resides in the provision of a bridge to span the length of a single-gang outlet box and adapted to support interchangeably a plurality of wiring devices together with removable separating means which divide the box into compartments, each housing a single one of the wiring devices.

Other objects and features of the invention such as the construction, shape, and manner of mounting the various wiring devices, the construction of the bridge, the means for attaching the separators and the wiring devices to the bridge as well as details of the face plate and its mounting and other parts which will be more clearly set forth hereinafter will be evident to those skilled in the electrical wiring art from a consideration of the accompanying drawings and following specification wherein are disclosed several exemplary embodiments of the invention with the understanding, however, that these various embodiments or parts thereof may be assembled and rearranged to form new combinations such as fall within the scope of the appended claims without departing from the spirit of the invention.

Figure 1:
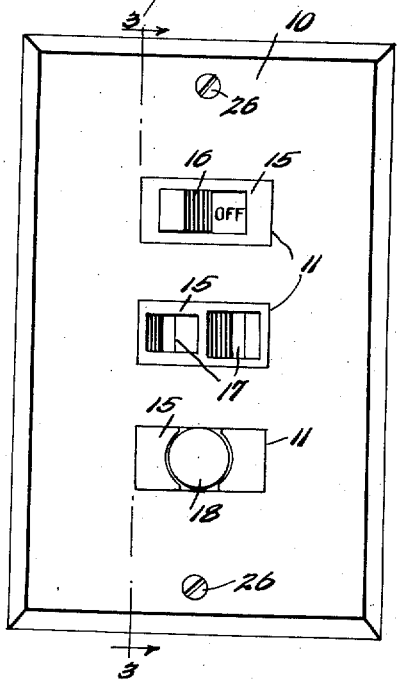
Figure 1 is a front elevation of a single gang wall plate with three wiring devices assembled behind and through it.

When placing wiring devices for walls, baseboards, and the like, in homes, offices and other buildings, it has heretofore been the custom, for which the wiring devices were designed, to mount each device, such for instance as a switch, convenience outlet, pilot light, etc., in a single-gang outlet box or at least in the space of a single-gang outlet box, for where several devices were to be mounted in a group a larger size, multi-gang box was used to receive them. The outlet box adapted to receive a single such heretofore-customary device has by usage come to be known as a "single gang" box and likewise those for two devices as "two gang" boxes, etc., so that the expression "one gang", or "two gang", "three gang", etc., designates clearly to those skilled in the art the size of the box and the cooperating parts as, for instance, the wall plates; such designations having especial reference to the effective size of the frontal opening of the box, which opening is overlain by the ported area of the wall plate and through which box-opening the devices are inserted after having been wired. Manufacturing standardization has uniformized the effective sizes of these openings, so that a single-gang box (whatever be its specific body-construction) has a substantially-rectangular opening of substantially $2\frac{13}{16}$ inches height by $1\frac{13}{16}$ inches width; two-gang box openings being of the stated height but twice the stated width and so on. The standardized spacing of the screw-receptive "ears" on the box provides a pair thereof, with the screw holes $3\frac{9}{32}$ inches apart, respectively above and below each such gang space, on the longitudinal center-line of the space.

Integrally-formed units have been used, each for placement in a single-gang space, in which wiring devices, including switches, are joined in preconceived combinations, and corresponding multi-ported wall plates are used therewith. But in order to make up a desired and special combination, including, say, a switch, a convenience outlet and a pilot light as above referred to, it has been necessary to resort to the expedient of using the space of a single-gang for each element of the combination and where a number of elements were desired the apparatus became exceedingly cumbersome and certainly did not add to the ornamentation of the room owing to the large size of the wall plate.

In accordance with the present invention, there are provided means for mounting one, two, or three wiring devices in a single box and behind a single-gang plate, which plate may be provided with three or less uniform openings. These devices are provided with uniform parts to cooperate with the openings in the plates and are arranged with mounting means so that they can be interchangeably secured behind the openings in the plates whereby it is possible to make up any desired combination of three units in a single-gang box and multiples of these in two and three-gang boxes by the use of parts constructed according to the present invention, comprising multiple opening plates and a quantity of wiring devices.

With this arrangement the stock required to be carried by a jobber or contractor is reduced to about one-sixth of the amount heretofore required to be carried while permitting a greater flexibility of combinations. In fact, several hundred combinations are possible with but less than twenty items for their accomplishment. The economy in manufacturing so few items is apparent. The consumer benefits in his wiring costs and in the appearance of the visible outlets. In most cases, with these interchangeable devices, the installation of a single-gang box is all that is necessary whereas now two or more gangs have to be installed to provide similar combinations, requiring more wall space, more expensive multiple gang plates and boxes, and more labor.

The present invention is feasible largely by virtue of the unique construction of the individual units whereby they are sufficiently small so that three can be assembled in a single-gang box and by virtue of the novel means for supporting and mounting these units in proper position and spacing for association with the openings in the wall plate.

Wherever in the specification and claims the expression "one-gang" or a similar expression is used, it is intended to refer to what is commonly known by that designation, as above set forth. The expression "wiring device" refers to any individual unit intended for mounting in an outlet box behind and/or through a wall plate and includes blanks for closing unused openings in the plate.

Referring now to the drawings, there is shown in Figure 1 a single-gang wall plate 10 which may be of more or less conventional style, preferably formed of molded insulating material such as one of the well-known phenol condensation products and having a plurality of symmetrically spaced openings or ports 11 therein all of the same size and shape for uniformity such that interchangeability of all of the devices is possible.

Figure 6:
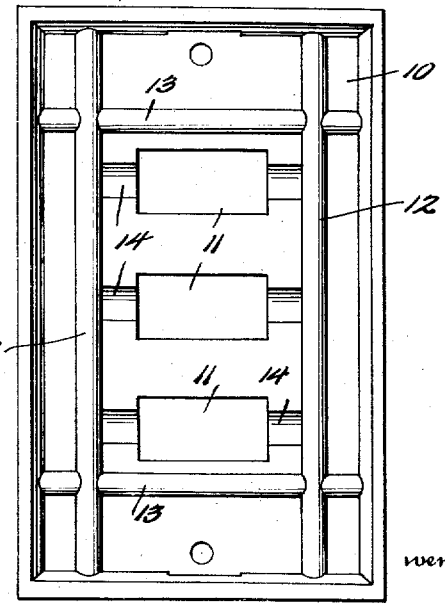
Fig. 6 is a back view of a wall plate of single gang size arranged to receive three wiring devices.

As seen in Fig. 6, the rear of the wall plate 10 is preferably reenforced by vertical ribs 12, horizontal ribs 13, and has shallow channels 14 leading to the openings or ports 11. It is preferred to have the openings provided with straight sides passing through the plates at right angles to the face thereof in order to snugly receive the elongated necks 15 on the wiring devices which cooperate therewith.

As seen in Figure 1, the upper device is a toggle switch having the operating handle 16, the middle device is a convenience outlet provided with the standard spaced slots 17 for the reception of the blades of an attachment cap or plug and the lower device is a pilot light having the lamp 18 arranged with or without a jewel as desired. This jewel as known to the industry, is a piece of red glass, molded or cut to fit into an opening in a switch plate.

It is evident from the interchangeability previously mentioned that combinations can be made up consisting of all switches, or convenience outlets, combinations of these two, or in fact any combination for which the wiring devices are available, and it is contemplated that they be made, in addition to the devices heretofore recited, in radio outlets, telephone outlets, push buttons, cord outlets, and the like as well as in blanks which can be used to close an opening in a plate, which may be reserved for future use.

It is clear that where but a single device is required a plate having but a single opening may be used, and where two devices are required the plate having only the upper and lower openings may be used, but since the necks of the devices fill the openings and are flush with the face of the plate, it can be seen that a three-opening plate will be all that is really necessary since the unused openings can be filled with blanks without detriment to its appearance and will provide ready means for inserting additional units when desired. Where more than three devices are required a plate to cover a multiple gang box is used and the openings therein are spaced as desired for the various combinations.

As the drawings show, the toggle switch is of such low height that three thereof may be placed one above the other, in stacked relation, in the height of the outlet box opening and all other-purpose devices shown may be similarly arranged, each in the space allotment of a switch.

Figure 2:
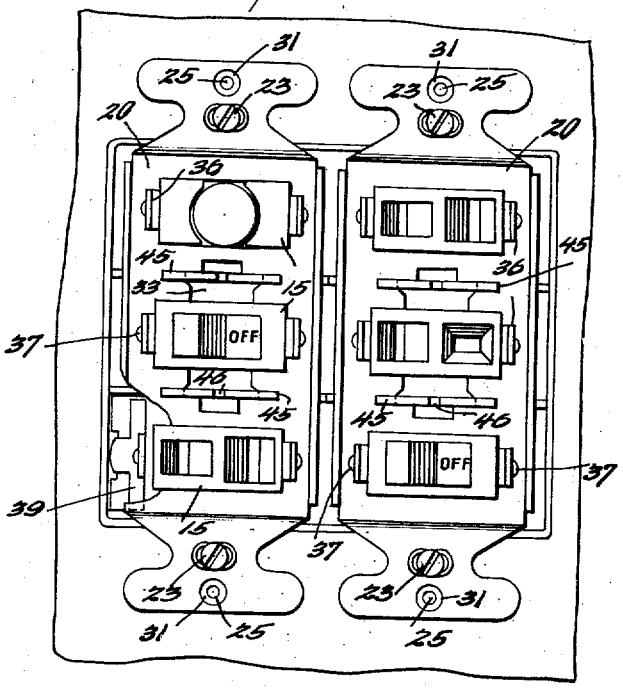
Fig. 2 is a face view of a two-gang outlet box having two bridges constructed according to the present invention mounted thereon and each supporting an assortment of wiring devices in readiness to receive the two-gang wall plate.
Figure 3:
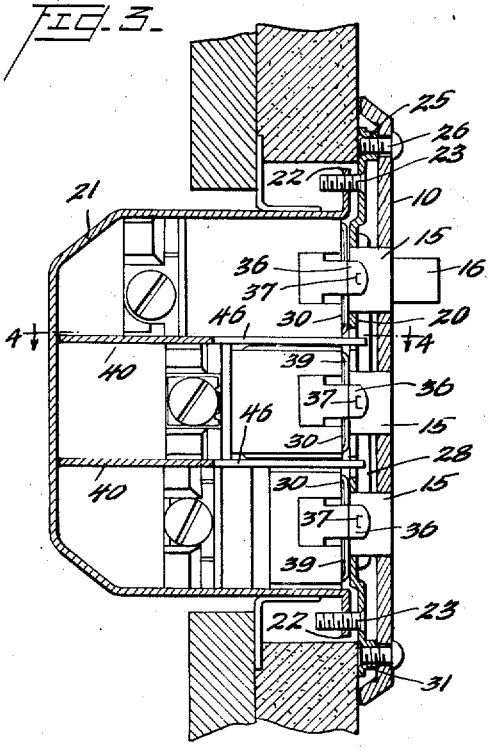
Fig. 3 is a sectional view taken on line 3—3 of Fig. 1.

As seen in Figs. 2 and 3, each of the wiring devices is secured to or carried by a bridge member 20 which extends along the center of the single-gang opening of box 21 in the direction of its height or longest dimension as seen in Fig. 3, or along its respective gang-space of a two-gang box as shown in Fig. 2, and is secured to the ears 22 thereon by means of screws 23 passing through slots in the bridge in substantially the same manner as is a single unit of the old style secured to an outlet box.

While the individual wiring devices, each complete in itself, which are secured to the bridge are not necessarily of the same specific size or shape, each toggle switch is, as shown, of a height slightly less than the spacing between centers of adjacent wall plate openings and each other-purpose wiring device requires no more room than the switch, so that, as illustrated, any selected three wiring devices, stacked one above the other, may be inserted into a gang-space allotment of an outlet box opening and with the neck portion of each wiring device in register with a wall plate opening.

In the present instance, owing to the substantially complete use of the intermediate portions of the bridge, the screws for attaching the wall plate are received in threaded openings 25 in bosses 31 in the plaster ears on the bridge beyond the slots for receiving the screws 23. The arrangement of the screws 26 for holding the wall plate in position, is clearly seen in Fig. 3.

Figure 5:
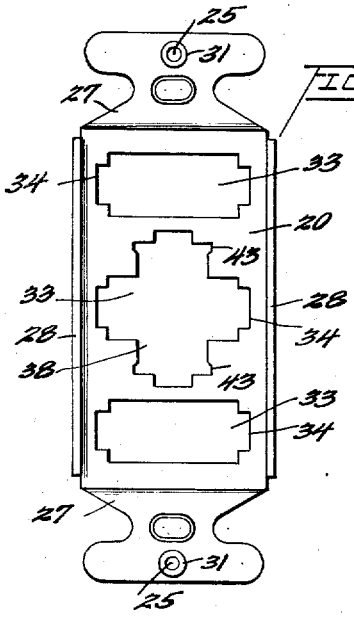
Fig. 5 is a face view of one form of bridge.

The bridge is made from a stamping of heavy sheet metal as seen in Fig. 5 and in addition to the end members 27, it is provided with the upturned border ribs 28 which materially strengthen the bridge against bending even with the cut-outs for the wiring devices which are provided therein. The center portion of the bridge may be depressed slightly below the ends 27 thereof so that when mounted it stands a distance beneath and parallel to the back of the face plate as seen in Fig. 3.

Each of the wiring devices as previously mentioned is provided with an elongated neck 15 of uniform size and of such shape as to snugly fit the openings 11 in the wall plate. In the form shown in Figs. 1 to 9, inclusive, these necks are of uniform length, which length is such that when the shoulder 30 at the bottom of the neck abuts the underside of the bridge the end of the neck is flush with the outer face of the wall plate. This wall plate is properly spaced from the shoulder to ensure this by causing the plaster ears of the bridge to rest on the wall as shown in Fig. 3 and then drawing the wall plate down against the plaster by its screws 26 as shown and thus uniformity of mounting is ensured. The bridge can be spaced toward or from the front edges of the outlet box in the customary manner as by placing washers between it and the lugs 22 and can be adjusted to ensure vertical alignment by virtue of the slots in the bridge through which the screws 23 pass. This latter is in lieu of using the plaster ears on the bridge.

The bridge will be seen to be mounted between the plate and the main portions of the wiring devices. The bridge is provided with three openings 33, each of a size to snugly receive the neck 15 of any one of the wiring devices and in each end of these openings is an extension or bay 34 to permit the passage alongside of the neck of one of the attaching spring clips 36, two of which are attached to each wiring device as shown in Figs. 2 and 3. These clips are of spring material and are arranged to snap through the bays 34 and to have lugs 37 which snap over the upper surface of the bridge and secure the individual units in position therein. The lateral arms 39 of the clips are sprung between the underside of the bridge and the shoulder 30 to ensure against looseness. By squeezing the lugs toward each other, they can be released from the bridge for the removal of the wiring devices.

In case it is desired to use a single unit in a box and to position it with its major axis in alignment with the major axis of the wall plate, the central opening 33 is crossed by a correspondingly shaped opening 38 at right angles thereto as shown in Fig. 5, so that the center device can be applied either with its major axis coincident with or at right angles to that of the bridge.

Figure 7:
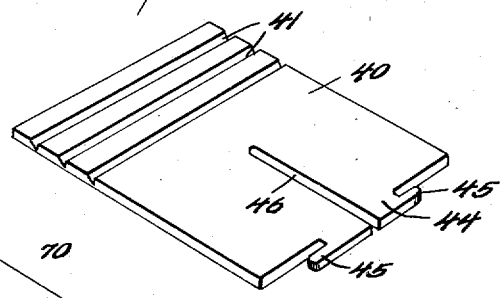
Fig. 7 is a perspective view of one of the separators.
Figure 4:
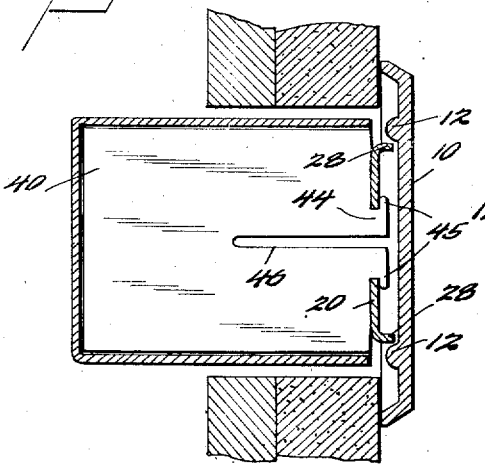
Fig. 4 is a sectional view at right angles to that of Fig. 3 and taken on line 4—4 of Fig. 3, and showing in elevation a separator carried on the bridge member.

In certain cases, the wiring codes require that wiring units on different systems be housed in separate boxes and to provide faciilty for this, separators 40, as shown in Figs. 3, 4 and 7 are provided for insertion between the wiring devices which are made of such width as to leave spaces between them for the separator. These separators have their narrow dimension such as to fit snugly within the box as shown in Fig. 4 and, to accommodate various depths of boxes, are provided of the maximum depth and equipped with weakened portions formed by the grooves 41 therein so that they can readily be broken to the proper length with facility.

For securing the separators into the bridge, the longitudinal opening 38 at the center of the bridge has its corners widened or notched as at 43, and the separator 40 is provided with the reduced neck portion 44 of a width to snugly fit between the ends of the notches 43 and with the over-hanging lugs 45 to prevent longitudinal slipping. In order that the neck 44 can be slipped between the narrower sides of the opening before reaching the notches 43, it is longitudinally slotted as at 46 to provide resilience and is preferably inserted by first pressing one side of the neck into a notch 43 and then partially rotating the separator until the other side snaps into the corresponding notch. When mounted, the position will be as shown in Fig. 4. The use of these devices is optional or in accordance with the requirements of the location being wired, and it is obvious that when they are used separate knock-outs must be removed from the box to receive wires from the various devices but when they are not used a single knock-out may bring in the conductors for all devices if desired.

Figure 8:
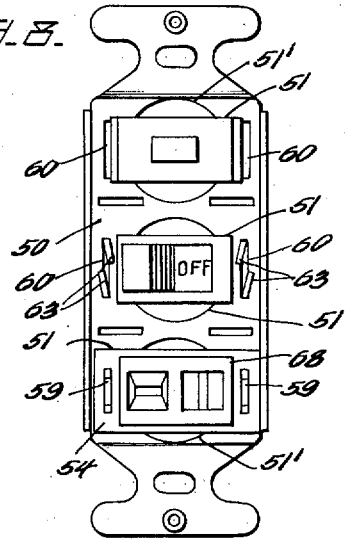
Fig. 8 is a face view of another form of bridge having mounted therein modified wiring devices.
Figure 9:
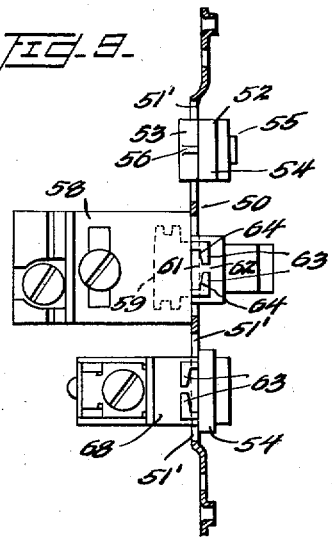
Fig. 9 is a central sectional view of the subassembly of Fig. 8, showing the devices in elevation.

Since the most important feature of the present invention is the interchangeability of the various wiring devices as regards position and utility in the bridge or in respect to the openings in the wall plate, it is obvious that the invention is not at all limited to the specific means of mounting these devices either in the bridge or in respect to the plate. For instance, in Figs. 8 and 9 is shown an alternative arrangement in which a bridge 50 is provided which is in most respects similar to that shown in Fig. 5 but in which the openings 51 for the passages of the necks on the wiring devices are mainly rectangular and of the same size as the neck. Each opening 51, however, intersects a circular opening 51′ of less diameter than the length of the major axis of the opening 51.

By careful designing, some of the wiring devices, such as the convenience outlet 68, can be made sufficiently small so that the main body portion thereof may pass through one of these openings 51 so that, in effect, the device has a neck 52 and a body portion 53 of the same size in cross-section and separated by the flange or collar 54 which is of just the thickness of the space between the upper face of the bridge and the lower face of the wall plate so that the device can be mounted with the flange resting on top of the bridge and be held in position either by some mechanical means, to be later described, or by friction until the plate is applied, after which it is clamped between the bridge and plate and permanently secured in position.

As seen in the small push button device 55 shown in Fig. 9, there is a thin fin or rib 56 on the body portion 53 which is slightly mutilated when the device is being pressed into the opening in the plate and provides additional friction to ensure the device remaining in position while the bridge is mounted and the plate positioned over it.

In the case of devices such as switches, the body portions of which are too large to pass through the opening in the bridge, they are provided with the neck exactly as described in connection with the first form of the invention but instead of having the spring clips for securing them in position the body 58 is provided with two metal plates 59 partially embedded therein and having portions extending up alongside of the ends of the neck and parallel thereto which pass through slots 60 provided in the bridge adjacent to the main openings therein. Each plate 59 has the hole 61 therein connected to the upper edge by the small slot 62 and the under edges of the fingers 63 thus provided are inclined as seen in Fig. 9. The spacing of the devices in the bridge is such that the inclined lower side 64 of these fingers intersects the plane of the upper face of the bridge so that if a screw driver, for instance, is placed in the slot 62 and twisted the two fingers 63 will be oppositely bent as seen in Fig. 8 and the inclined under edges thereof will bind on the face of the bridge to securely lock the device in the bridge with the shoulder tightly pressed against the under surface of the bridge.

Such units as the convenience outlet 68, seen at the lower part of Figs. 8 and 9, can be constructed to pass through the opening in the plate and to have the flange 54 as described in connection with the push button but if it is desired to provide more secure attachment to the bridge, for instance to transmit the pull of removing a plug thereto instead of to the wall plate, this can be done by providing the device with two of the plates 59 extending downwardly instead of upwardly, as in the case of a switch, and operated in exactly the same manner as those just described.

Figure 10:
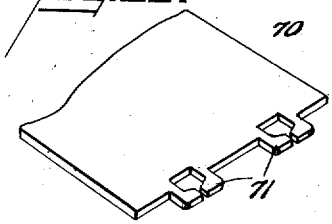
Fig. 10 is a perspective view of a portion of a separator of the type for use with the bridge of Fig. 8.

For use in connection with the devices of Figs 8 and 9, a separator 70 such as shown in Fig. 10 is employed. It is substantially like that of Fig. 7 except for the fastening means 71 which while integral with the separator are nevertheless constructed like the plate 59 shown on the switch and convenience outlet.

Figure 11:
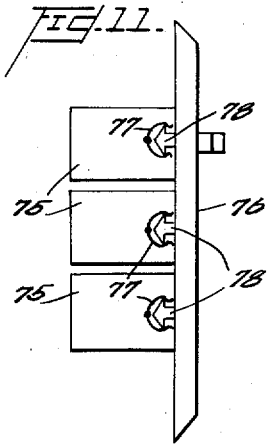
Fig. 11 is a side elevational view of a wall plate having wiring devices attached directly thereto without the use of a bridge.
Figure 22:
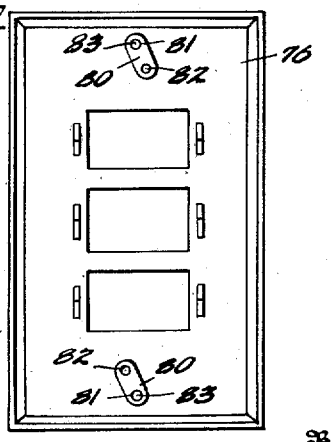
Fig. 22 is a rear elevational view of a wall plate having mounted thereon adjusting devices to permit the plate to be properly positioned on the wall irrespective of slight irregularities in the mounting of the outlet box.
Figure 23:
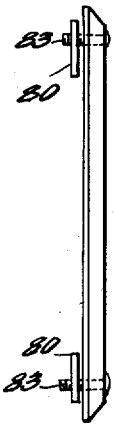
Fig. 23 is a side elevational view of the assembly of Fig. 22.

While it is convenient for assembly, and probably makes a mechanically superior device, the bridge is not necessary and means such as shown in Fig. 11 can be provided to directly secure the individual wiring devices to the wall plate in which case they can be individually wired, attached to the wall plate and then the plate secured to the outlet box by screws engaging the ears thereon or in any desired manner. The devices 75 are interchangeable in position in the plate 76 and there may conveniently be attached to their sides the double spring members 77, the ends of which converge and snap over the headed projections 78 extending rearwardly from the wall plate. Various other mechanical expedients for attaching the devices directly to the plate will be obvious to those skilled in this art and it is not the intent to suggest even that the mechanism shown is the best but only that it is representative of a form of mechanism for securing the devices interchangeably and directly to the wall plate.

Where such an arrangement is used as shown in Fig. 11 there is not the provision for adjustment of the bridge to ensure proper alignment of the wall plate so that it is vertical or horizontal, as desired, in the event that the box is not mounted truly (and it usually is not) so that resort may be had to the mechanism shown in Figs. 22 and 23 to properly position the plate for the sake of appearance. Here each plate is provided with a pair of metal straps 80, each approximately one-half an inch in length and provided with a pair of holes 81, 82, respectively. The holes 81 are tapped for screws 83 which pass through the plate and are received in these tapped openings. The holes 82 are of sufficient size to clear the screws which are received in the lugs at the ends of the outlet box. In operation the straps 80 are secured to the lugs of the box and the screws are tightened only sufficiently so that the straps can be adjusted in position to be spaced properly to receive the screws from the plate. When these are loosely entered into the straps the plate is then twisted until it is vertical, after which the screws holding it to the straps may be removed, the screws securing the straps to the box tightened, and the plate repositioned and securely fastened. This device is extremely simple and yet permits of a wide range of adjustment for properly positioning the plate.

Figure 12:
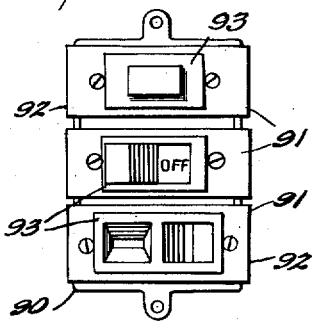
Fig. 12 is a face view of an outlet box, showing three wiring devices each mounted thereon by means of an individual transverse bridge.
Figure 13:
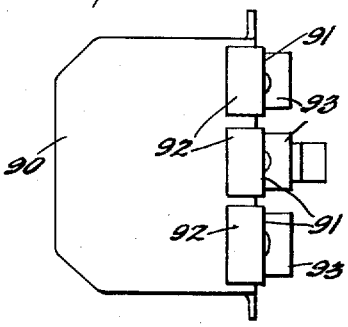
Fig. 13 is a side elevational view of the assembly of Fig. 12.

A further manner of avoiding the use of a single main bridge is suggested in Figs. 12 and 13, wherein three interchangeable units of any desired type are shown mounted in the outlet box 90 wherein each unit is provided with an individual bridge or strap 91 which extends transversely of the box and has the downturned ends 92 which may be bent inwardly toward each other slightly and are somewhat springy so that these units may be snapped over the box after they have been wired, and then adjusted in respect to each other and the ends of the box so that their necks 93 are properly received in the openings in a wall plate such as that shown in Figs. 1 and 6. The plate will hold the devices in longitudinal adjustment and will when secured to the box of course hold them against the upper edges of the box so that they are fixed against movement in any direction.

Figure 14:
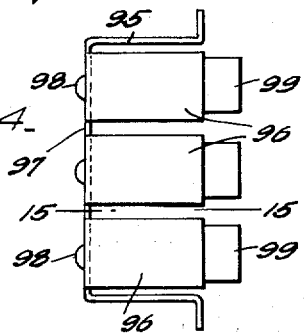
Fig. 14 shows an asembly of bridge and wiring devices wherein the bridge has a drop center and passes beneath the devices.
Figure 15:
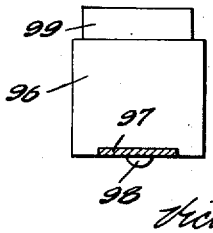
Fig. 15 is a transverse sectional view on line 15—15 of Fig. 14.

Figs. 14 and 15 show a further manner of mounting the wiring devices wherein a strap bridge 95 is provided of generally U-shaped configuration with the units 96 supported from the bottom thereof and attached thereto as for instance by straddling the strap 97 at the bottom of the U and having a screw 98 passing up into the device through the strap or by any other mechanical attaching means. Each of the devices has a rectangular neck 99 as described in connection with the previous forms and the only difference in the devices used with this type of bridge and those previously described is that they must be of uniform height.

Figure 16:
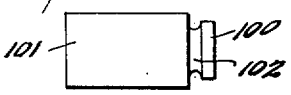
Fig. 16 is a side elevational view of a wiring device for association with a further form of bridge.
Figure 17:
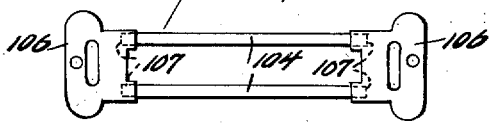
Fig. 17 shows in plan view a bridge for use with wiring devices as shown in Fig. 16.

In the event that it is desired to use a still further form of bridge resort may be had to the mechanism of Figs. 16 and 17 wherein the neck 100 of the wiring device 101 is provided with a groove 102 at the junction of the shoulder and the neck to receive the circular rods 104 of the bridge shown in Fig. 17. These two rods are spaced a proper distance apart to tightly engage the sides of the grooves by means of the end members 106, each having a pair of sockets 107 to receive the rods. The rods may be secured in the sockets of one of the end members and the other may be loosely fitted thereto so that this end member can be removed for the insertion of the desired number of wiring units after which the end member is returned to position and the bridge mounted on the box. Longitudinal spacing of the elements may be accomplished by making them of the desired width or they may be adjusted by hand so that their necks fit the openings in the wall plate.

Figure 18:
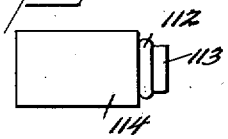
Fig. 18 is a view similar to Fig. 16 for a slightly different form of bridge.
Figure 19:
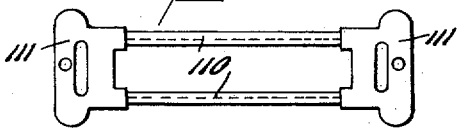
Fig. 19 is a view similar to Fig. 17 of a form of bridge for use with the devices of Fig. 18.

In Figs. 18 and 19 is shown a modification of Figs. 16 and 17 wherein, instead of rods, channels 110 of U-shaped cross-section may be fitted between the end members 111 and have their open sides facing each other to engage around a bead 112 at the junction of the neck 113 and body 114 of the wiring device.

Figure 20:
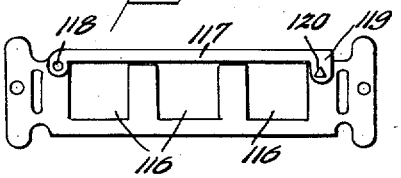
Fig. 20 is a face view of a bridge having a hinged side for ease in assembling wiring devices therein.

Another form of bridge is shown in Fig. 20. This is stamped from sheet metal somewhat to the shape of the bridge of Fig. 5 and provides three openings 116, for the interchangeable mounting of suitable wiring devices, for instance those having grooves in their necks as shown in Fig. 16. To permit these to be inserted one side 117 of the bridge is removable and is pivoted at 118 to the main portion of the body. It may be conveniently formed by folding a strip of metal so that it fits over the main portion of the bridge to receive therethrough the pivot pin 118 and the opposite end may have fingers 119 to clasp the front and back of the bridge to hold the member 117 in position. These fingers may have slight inward projections 120 thereon to be received in an opening in the bridge to form a friction lock to hold the side member in place.

Figure 21:
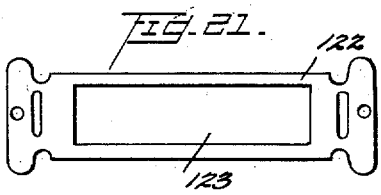
Fig. 21 is a face view of a further form of bridge having a single elongated opening for receiving a plurality of wiring devices.

A still further form of bridge is shown in Fig. 21 wherein a pressed sheet metal member 122 is provided with a single large opening 123 to receive the desired number of wiring devices, for instance, of the type which pass through the opening and have a flange resting on the upper surface of the bridge and in which the spacing and securing is done by the wall plate as in connection with some of the devices of Figs. 8 and 9.

It will be evident that features of certain of the embodiments can be used in conjunction with other embodiments and that various modifications can be made without departing from the main features of the invention.

I claim:

1. The combination with a single-gang outlet box and a single-gang wall plate having a plurality of ports one above another, of a plurality of independent wiring devices including at least one switch and one other-purpose wiring device, each adapted to cooperate with any wall plate port; a single supporting bridge for all of said devices interposed between their main portions and the wall plate and carried by the box; said devices having like reduced portions in front of their main portions and said bridge having openings interchangeably receiving said reduced portions from the rear, said devices when arranged on said bridge for cooperation with the wall plate ports being receivable in the opening of said single-gang outlet box.

2. In electric wiring apparatus to provide selective-position group mounting of interchangeable wiring device units, different in purpose and body size, in an outlet box having an opening of standard single-gang area and for use with a single-gang wall plate having three uniform ports one above another; the combination of three respective wiring devices for said wall plate ports from among individual interchangeable wiring devices including switches and other-purpose devices of different body-sizes, each whereof is of a height not greater than one third of the height of a standard single-gang outlet box opening, and each whereof has a like sized neck of less than body cross-section projecting forwardly from its main body portion; and an apertured mounting bridge adapted to be secured to an outlet box to span the height of a single-gang opening thereof and through which the necks of all said devices pass from the rear in positions for registry with respective wall plate ports, and means securing said wiring devices on said bridge.

3. The combination with an outlet box having an opening of multi-gang grea, of a correspondink multi-gang wall plate having a plurality of uniform openings arranged one above the other for each gang area; an individual, interchangeable wiring device for each opening from an assortment including switches, convenience outlets, and other-purpose wiring devices; and a separate bridge means for each gang, extending vertically of the gang area and near said plate, engaging interchangeably the devices for said gang area to support them independently of the plate in register with respective plate openings.

4. The combination with a single-gang outlet box, of a single-gang wall plate having therein a plurality of uniform openings one above another; an individual, interchangeable wiring device at the back of the plate for each opening, said devices having like-shaped forwardly projecting necks; a bridge behind the plate secured to the outlet box, said bridge having a plurality of openings respectively corresponding in position to each opening in the plate, and the necks of said devices interchangeably entering said bridge openings from the rear; and means securing said devices to said bridge.

5. The combination with a single-gang wall plate having two or more uniform openings therein, of an interchangeable wiring device at the back of the plate for each opening, each device having a neck fitting into the corresponding plate opening, a bridge behind the plate and adapted to be secured to an outlet box, said bridge having an opening corresponding to each opening in the plate, said devices interchangeably fitting said bridge openings and insertable from the rear thereof, and means to secure each device to the bridge.

6. The combination with a single-gang wall plate having at least two uniform openings therethrough and a single-gang outlet box, of an interchangeable wiring device at the back of the plate for each opening and having an elongated mounting portion, a bridge secured to said box and having elongated openings to interchangeably support said devices in proper relation to said plate openings, said bridge having an opening to support one of said devices in one or the other of two positions at right angles to each other.

7. The combination with a single-gang wall plate having at least two uniform openings therethrough and a single-gang outlet box, of an interchangeable wiring device at the back of the plate for each opening, a bridge secured to said box and interchangeably receiving said devices in proper relation to said openings, and permanently attached means on one of said parts to engage the other and hold the devices immovably on the bridge.

8. Apparatus for electric wiring comprising a bridge member for mounting across the face of an outlet box and a plurality of different wiring devices, said bridge providing mounting for a plurality of said devices interchangeable in position and function, and permanently attached interengaging means on said bridge and devices for securing them together.

9. Wiring apparatus for use in a single-gang outlet box comprising a bridge member to extend longitudinally of the mouth of the box and having a plurality of uniform, spaced openings therethrough, a plurality of different wiring devices for cooperation with said bridge and each having a neck for passage through a similar opening in a wall plate, some of said devices having said neck elongated for passage also through one of said openings, certain of said devices having a body portion of a size to pass through one of said openings and means to secure said devices interchangeably in said bridge.

10. In electric wiring apparatus, the combination with an outlet box having an opening of standard single-gang size; of a single-gang wall plate from an assortment ported, respectively, with three ports one above another, with upper and lower ports, and with a middle port; a respective wiring device for each port, from among individual, interchangeable wiring devices including switches and other-purpose wiring devices, each said device being of such size that three thereof may be assembled one above another in said box opening and each having a reduced forward portion; and a single mounting-bridge adjacent to the plate, said bridge being apertured to interchangeably receive in the three port-registering positions the reduced portions of three wiring devices and supporting the requisite number of wiring devices for the selected plate.

11. In electric wiring apparatus, the combination with an outlet box having an opening of the standard height and width of some gang-number; of a wall plate covering said opening and having ports for a plurality of wiring devices per gang, said ports being arranged one above another; a like plurality per gang of individual, independent, interchangeable wiring devices, each selected from an assortment including switches and other-purpose wiring devices, each of such size that a plurality thereof may be assembled one above another in a single-gang area of said box opening; and individual bridge means per gang-area, mounted on said box and extending vertically of its gang-area and adjacent to the wall plate, supporting interchangeably, in any desired combination per gang, the wiring devices of its gang-area each in register from the rear with a respective one of said wall plate ports.

12. In electric wiring apparatus, the combination with an outlet box having an opening of standard height and width of some gang-number; of a wall plate covering said opening and having ports for a plurality of wiring devices per gang, said ports being arranged one above another; a like plurality per gang of individual, independent, interchangeable wiring devices each selected from an assortment including switches and other-purpose wiring devices, each of such size that a plurality thereof may be assembled one above another in a single-gang area of said box opening and each having a forwardly projecting neck of like shape; and individual bridge means per gang area mounted on said box for lateral adjustment thereon and apertured to receive from the rear the necks of the wiring devices of its gang in any desired combination per gang and supporting said wiring devices each in register from the rear with the respective one of said wall plate ports.

13. In electric wiring apparatus to provide selective-position group mounting for interchangeable wiring device units, the combination of an outlet box having an opening of the standard height and width of some gang number, a detachable wall plate covering said opening and having three laterally-elongated uniform ports one above another per gang area; a like number per gang of complete independent wiring devices including a switch, these being devices from an assortment that includes switches of substantially rectangular section, greater in width than in height, and of such size that three thereof may be assembled one above another in a single gang-area of said box opening and including also other-purpose wiring devices, each receivable in the space allotment of a switch; and supporting means carried by the box and arranged one per gang-area, each along the height of its gang-area, said means supporting the wiring devices of its gang area in respective register with the wall plate ports of that area.

14. In electric wiring apparatus to provide selective-position group mounting for interchangeable wiring device units different in purpose and body size, the combination of an outlet box having an opening of the standard height and width of some gang number, a detachable wall plate covering said opening and having three laterally-elongated uniform ports one above another per gang area; a like number per gang of complete independent wiring devices, these being devices from an assortment that includes switches having main body portions of substantially rectangular section, greater in width than in height, and of such size that three thereof may be assembled one above another in a single gang-area of said box-opening and including also other-purpose wiring devices of different body-portion size, each receivable in the space allotment of a switch, each said wiring device having a like-shaped reduced neck in front of its body portion; and supporting-bridge means carried by the box and arranged one per gang-area, each along the height of its gang-area, said bridge means being apertured to receive from the rear the necks of the wiring devices of its gang-area and supporting them in register with the wall plate ports of that area.

15. In electric wiring apparatus, the combination with an outlet box having an opening of standard height and width of some gang number; of a wall plate covering said opening and having ports for a plurality of wiring devices per gang, said ports being arranged one above another; a like plurality per gang of individual, independent, interchangeable wiring devices each selected from an assortment including switches and other-purpose wiring devices, each of such size that a plurality thereof may be assembled one above another in a single gang area of said box opening; and supporting means for said wiring devices supporting interchangeably, behind said wall plate and in any desired combination per gang, the selected wiring devices each in register from the rear with a respective one of said wall plate ports.

16. In electric wiring apparatus, the combination with an outlet box having an opening of standard height and width of some gang number; of a wall plate covering said opening and having ports for a plurality of wiring devices per gang, said ports being of uniform size and arranged one above another; a like plurality per gang of individual, independent, interchangeable wiring devices selected from an assortment including switches, convenience outlets and other-purpose wiring devices, each of such size that a plurality thereof may be assembled one above another in a single gang area of said box opening and each having a portion for insertion into the rear of a wall plate port; and supporting means arranged one per gang area supporting interchangeably in position thereon any desired combination per gang of the selected wiring devices, each in register with the respective one of said wall plate ports.

17. Electric wiring apparatus of the class described, comprising an outlet box having an opening of the standard height and width of some gang-number; interchangeable wall plates therefor; an assortment of individual, independent, interchangeable wiring devices including switches, convenience-outlets and other-purpose wiring devices, each of such size that three thereof may be assembled one above another in a single-gang area of said box-opening; and means to support in selected ones of three allotted positions per gang any selected number of said interchangeable wiring devices up to three; said interchangeable wall plates being ported, respectively, with a middle port, with upper and lower ports, and with three ports, per gang space, registering with respective allotted positions of said wiring devices on said supporting means.

18. Wall fitting structure for the provision of selected combinations of independent wiring devices per gang area of an outlet box, comprising an outlet box having an opening of the standard height and width of some gang-number, a detachable wall plate covering the opening and having a plurality of ports per gang area; a like plurality per gang of complete, independent wiring devices including a toggle switch, they being devices selected from an assortment which includes toggle switches each of such size that a plurality thereof may be assembled one above another in a single gang area of said box-opening and including also other-purpose wiring devices each receivable in the space-allotment of a switch; and means carried by said box and arranged one per gang area along the height of such gang area and having provision to support any said wiring device in register with any said port.

VICTOR R. DESPARD.